April 25, 1961   R. B. BARNES ET AL   2,981,913
SELECTIVE INFRA-RED DETECTORS
Filed Feb. 25, 1957   2 Sheets-Sheet 2
Fig. 4.
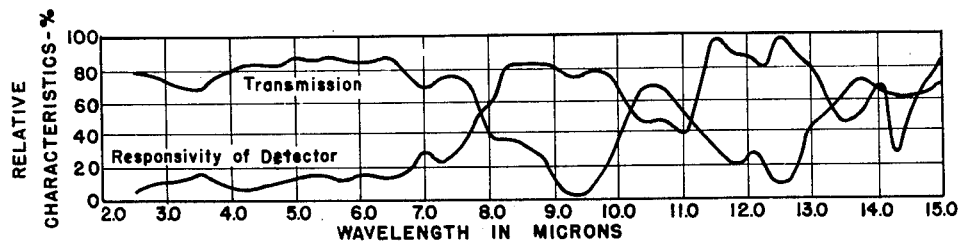
Fig. 5.
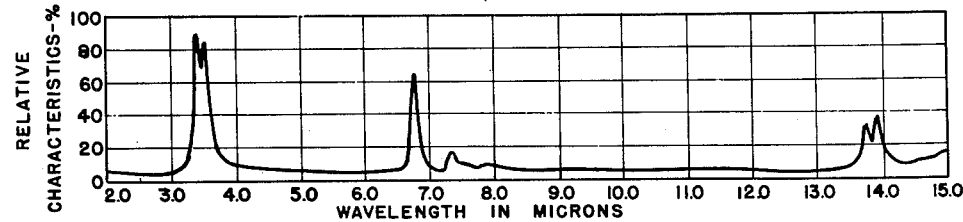
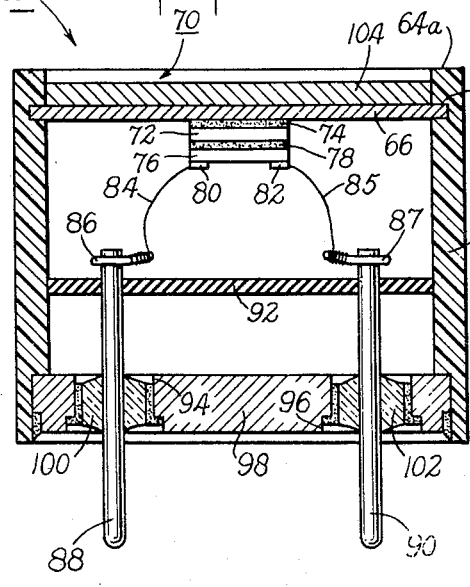
INVENTORS
ROBERT B. BARNES
ERIC M. WORMSER
RUSSELL D. DeWAARD
BY
Blair & Spencer
ATTORNEYS

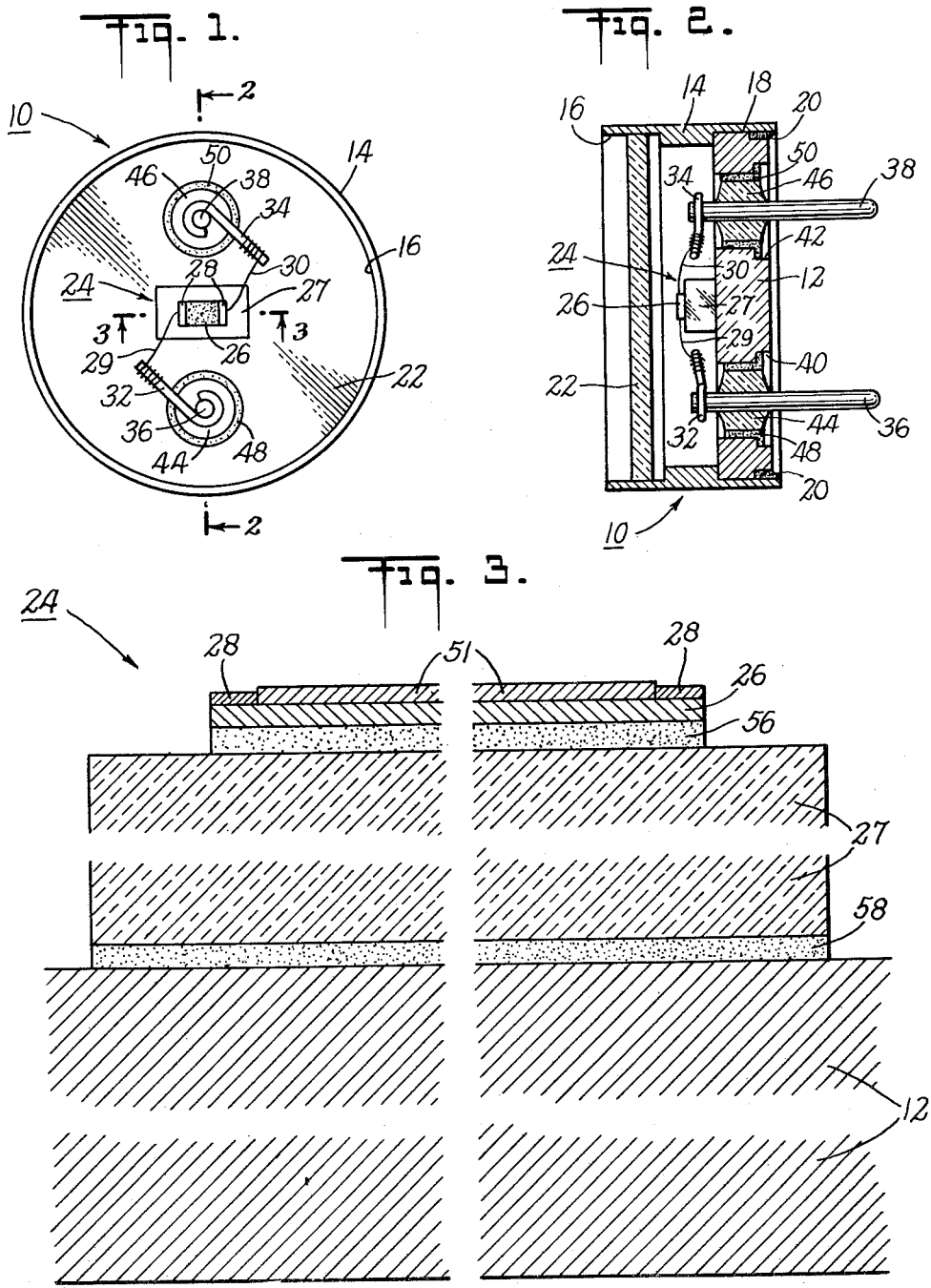

United States Patent Office 2,981,913
Patented Apr. 25, 1961

2,981,913

SELECTIVE INFRA-RED DETECTORS

Robert B. Barnes and Eric M. Wormser, Stamford, and Russell D. De Waard, Old Greenwich, Conn., assignors to Barnes Engineering Company, Stamford, Conn.

Filed Feb. 25, 1957, Ser. No. 641,957

6 Claims. (Cl. 338—18)

This invention relates to infra-red detectors sensitive to infra-red radiation of particular wave lengths. More particularly, it relates to thermistor bolometers sensitive only to intra-red radiation of specific wave lengths.

Studies of infra-red radiation emitted from various objects have wide commercial and scientific application in determining temperatures of objects inaccessible to ordinary temperature measuring devices of the type which depend on close thermal relationship with the objects for proper operation. For example, the high temperatures of certain metals would melt such devices; and their use on plastic being extruded from a die, by insertion into the plastic, may cause defects rendering the finished product unusable. Infra-red detectors, on the other hand, which determine the temperatures of objects by measuring the intensity of the infra-red radiation emitted therefrom, may be located at a safe distance from high temperature objects. In certain cases it is desirable to restrict the operation of an infra-red detector so used to certain wave lengths or groups of wave lengths in the infra-red spectrum. Such restriction of selection is helpful, for instance, in measuring the temperature of an object in close proximity to other radiation-emitting objects, for example, a sheet of plastic being extruded from a die. Since different materials emit and absorb radiation in different portions of the infra-red spectrum, it is possible to differentiate an object from its environment by restricting the response of the detector to those wave lengths emitted from it.

Apparatus used for selective detection of inra-red radiation has heretofore taken several forms, among the most important of which are thermistor bolometers with optical interference filters and gas cells having selectively absorbing gases acting on diaphragms. The interference filter is restricted in operation to a single group or band of infra-red wave lengths, but in many cases it is desirable to select or reject a plurality of bands in order to match the detector response to the emission characteristics of various materials. Moreover, these filters are restricted in operation to the near infra-red region, being generally unavailable for use beyond five microns. They are also expensive and difficult to manufacture. Other types of optical filters are expensive and difficult to make for use in the infra-red regions.

In the gas cell devices, the radiation is admitted to a sealed cell having a diaphragm displaced by expanding gas upon absorption of such radiation and the generation of heat thereby, the magnitude of its movement being a measure of the temperature of the object under study. These cells are affected by mechanical vibration and changes in ambient temperature which tend to obscure the readings of the radiation emitted from the object under study.

Accordingly, it is an object of this invention to provide improved apparatus for selective detection of particular wave lengths of the infra-red spectrum. It is another object of this invention to provide a detector of the above character whose response characteristics are substantially identical with the infra-red emission or absorption characteristics of a particular material. Another object of this invention is to provide an infra-red sensitive device of the above character utilizing a thermistor bolometer as the detecting element. It is yet another object of this invention to provide a device of the above character which is rugged in construction. It it a still further object of this invention to provide a device of the above character which is relatively insensitive to changes in ambient temperature. A final stated object of this invention is to provide a device of the above character which is simple and inexpensive in manufacture. Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which:

Figure 1 is an enlarged top plan view of our improved thermistor bolometer,

Figure 2 is a vertical sectional view taken along line 2—2 of Figure 1 showing the lead details in elevation for greater clarity, Figure 3 is an enlarged sectional diagrammatic view of the radiation sensitive portion of our thermistor bolometer taken roughly along the line 3—3 of Figure 1, Figure 4 is a composite graph illustrating the transmission characteristics of a silicone resin film and the response characteristics of an infra-red detector using an infra-red absorbing layer of the same material, Figure 5 is a graph illustrating the infra-red absorption characteristics of a polyethylene resin film, Figure 6 is an enlarged vertical sectional view of a more refined embodiment of our improved thermistor bolometer, with certain dimensions shown out of proportion to more clearly show the elements thereof, and Figure 7 is a similar sectional view of still another embodiment of our bolometer with the dimensions similarly exaggerated.

Similar reference characters refer to similar parts throughout the several figures.

In general, our bolometer comprises a thermistor, preferably in flake form, mounted in conventional manner on a backing block fastened in turn to a thermal sink. The thermistor flakes, whose electrical resistance changes in response to changes in internal temperature caused by heat energy conducted thereto or generated therein, are semitransparent in the infra-red regions and thus only about 50% of the infra-red radiation impinging thereon is converted into heat energy. Therefore, a thin coating of black lacquer is often applied to the surface of the thermistor flake to increase the efficiency of infra-red absorption, the coating converting upwards of 90% of the incident energy into heat which is then conducted into the flake to change the temperature thereof. We have found that, by substituting for the black lacquer coating a thin layer of material having desired infra-red absorbing characteristics, we can provide a thermistor bolometer having a selected infra-red wave length response. In other words, we replace the black lacquer, having a uniformly high absorption characteristic over the entire infra-red spectrum, with material which absorbs and converts into heat only the energy in certain given bands of wave lengths. The wave lengths not so absorbed are reflected or transmitted through to the flake which, as noted above, converts only about 50% into heat. Thus the bolometer is much more sensitive to certain wave lengths of radiation than to others and can therefore differentiate a material emitting or absorbing radiation of these wave lengths from other materials having different emission patterns. A selective detector of this type has the shock resistance, ambient temperature insensitivity, and other features inherent in the usual thermistor bolometer, e.g. relatively low cost, ease of use, and sensitivity. Moreover, the selectivity characteristics can easily be changed by merely substituting an absorbent film of a different material.

We have also found that the ability of the detector to differentiate the object under study from its environment may be improved by utilizing as a selective absorber a thin film of the material forming the object whose temperature is to be measured. For example, should it be desired to measure the temperature of a plastic being extruded from a die, an absorber made of that plastic may be used. A relatively complete "match" between the emission characteristics of the object and the sensitivity characteristics of the bolometer is then attained, as materials absorb various infra-red wave lengths with substantially the same relative efficiency with which they emit them.

Our bolometer may be further refined by inserting an infra-red reflector, e.g. a thin layer of copper, aluminum, or silver, between the absorbing film and the thermistor flake. In the wave length regions of low absorption of the absorbing layer, the reflective layer prevents the radiation from reaching the thermistor flake and reflects it back into space through the absorbing layer. In the wave length regions of high absorption, a high percentage of the energy is absorbed in the first traversal of the film. The residual energy, i.e. that energy not absorbed is reflected by the reflecting layer and a high percentage of this residual energy is absorbed in the second traversal outward. Thus, the effect of the reflecting layer is to make the detector almost completely insensitive to regions of low absorption and to substantially increase the energy absorption in the regions desired.

Another application of a selective detector of this type makes use of the essentially inverse relationship between the transmission and absorption characteristics of the material. Thus for example, a black body infra-red source may be placed behind a moving sheet of plastic or the like which transmits radiation of certain wave lengths to a detector which has an absorbing layer of the same material and is thus relatively insensitive to these wave lengths. If the proportions of the ingredients of the plastic should change or should impurities be present, the spectrum of the transmitted energy will change, resulting in a change in output of the selective detector. In this manner a material may be continuously monitored for purposes of controlling the conditions and materials of manufacture automatically if desired.

Referring to the drawings in detail and particularly to Figures 1 and 2, there is shown a construction which may be used to house and support our improved infra-red sensitive device, it being understood that other structures could be utilized for this purpose. A housing for a thermistor bolometer is generally indicated at 10, comprising a flat base 12 secured to a cylinder 14 to form a housing for the other parts of the device. Cylinder 14 has annular bores 16 and 18 adjacent its opposite edges, base 12 resting in bore 18 and being held in place by a solder seal or fillet 20. Base 12 is preferably copper or a steel alloy which has the same coefficient of expansion of certain glasses and thus can be attached directly to them without resultant heat damage. A window 22, which is transparent to infra-red energy and hence preferably made from thallium bromide-iodide, a synthetic optical crystal, or silver chloride, is cemented or otherwise secured in bore 16. A thermistor bolometer generally indicated at 24, to be more fully described hereinafter, is cemented or otherwise secured to base 12 and includes a thermally sensitive flake 26 and a backing block 27. The ends of flake 26 are preferably gold coated to form electrodes 28 (Figure 3), and leads 29 and 30 are connected thereto and to larger leads 32 and 34 which in turn are connected to pins 36 and 38 supported in holes 40 and 42 in the base 12 by glass seals 44 and 46. These seals are connected to the metal base by solder seals 48 and 50. Pins 36 and 38 are preferably shaped and located to plug into an electrical socket or the like. Accordingly, the device may be connected into a circuit so that a biasing voltage may be impressed across the flake 26 and signals from the flake amplified.

The structural details of bolometer 24 may be more readily comprehended from an examination of Figure 3 in which certain of the dimensions are greatly exaggerated for purposes of clarity. Thus flake 26, coated on its exposed surface with a radiation-absorbing layer 51 to be hereinafter described, is bonded to backing block 27 by a cement layer 56, and this entire assembly is mounted on base 12 in any suitable manner, as by cementing backing block 27 thereto by a cement layer 58. Accordingly, heat may be transmitted from flake 26 through the cement layer 56 to the backing block 27 and from there to base 12 for further dissipation.

Flake 26 is a resistor commonly known as a thermistor because of its high negative temperature coefficient and is preferably a mixture of oxides of manganese, nickel, and perhaps cobalt. It is also preferable that flake 26 be "optically flat," i.e. be able to pass between two plane parallel surfaces spaced apart no more than 5 microns greater than the flake thickness, a standard flake of 10 microns thickness thus passing between two plane parall surfaces 15 microns apart. Cement layer 56 should be of minimum thickness, i.e. as thin as possible while still performing its adhesive function. Plastic resins, especially the epoxy and phenolic resins, are preferred as a general class of materials to be used for the cement, since they provide strong but flexible bonds over wide temperature ranges. Backing block 27 is preferably an electrical insulating material such as sapphire. It may also be made of materials having similar heat transmission characteristics such as glass, quartz, beryllium oxide, or the like. If desired, good heat conductors such as aluminum, copper, or the like may also be used, in which case an insulating film should be interposed between it and thermistor flake 26 to electrically insulate the flake from the block.

In operation, infra-red energy falling on the window 22 is transmitted therethrough to radiation-absorbing layer 51 where it is converted into heat which is conducted to flake 26 to increase the temperature and cause a change in the electrical resistance thereof. The current flowing through the flake, because of the biasing voltage provided at the electrodes 28, changes and is detected by conventional electrical circuit means.

Prior absorbing films, which took the form of a black lacquer film applied directly to the surface of flake 26, have a relatively uniform absorption characteristic throughout the entire infra-red region. Our selective radiation-absorbing film 51 however, which may be applied directly to thermistor flake 26 (as shown in Figure 3) or joined thereto by a suitable non-absorbing cement layer, absorbs and converts into heat the incident infra-red energy of particular wave lengths while reflecting the remaining portions of the infra-red spectrum or transmitting them to thermistor flake 26. In other words, layer 51 acts as an infra-red filter. As layer 51 has a relatively high efficiency in converting radiation into heat in its absorbing regions and, on the other hand, thermistor flake 26 converts but approximately 50% of the transmitted energy into heat, the use of such an absorbing layer gives the assembly a selective response usable to determine the strength of infra-red radiation of particular wave lengths, and this is possible in the presence of radiation of other unwanted wave lengths. Because there are unlimited numbers of materials having different absorption characteristics, it is possible to find a material to absorb practically any band of wave lengths desired. Particularly, we have found many plastics suitable for such application.

In practice we have found that layer 51 operates best when having a thickness of from 0.0005 inch to 0.020 inch, depending on the strength of absorption. A film which is too thin may not absorb sufficient radiation in the desired regions, while one too thick may absorb in the undesirable regions. Also, a thick film has a greater "thermal mass" which impairs its response to rapid changes in the intensity of emitted radiation. Where layer 51 has electrical conducting properties, it should be insulated from thermistor flake 26 with a film of plastic or the like of minimum thickness necessary to perform its function.

When measuring the temperature of an object in close proximity to another radiation-emitting mass, it is desirable to use an absorbing layer 51 consisting of the same material as that of the desired object. Since the emission characteristics of a material are the same as its absorption characteristics, i.e. the proportions of infra-red energy emitted at various wave lengths are the same as the proportions absorbed and converted into heat at those same wave lengths, the use of such a film results in a "match" of the thermistor bolometer characteristics to those of the emitting body. In other words, the film will transmit or reflect without absorption all the incident infra-red energy in those wave lengths not emitted by the object under study. Thus the bolometer, while making maximum utilization of the energy emitted from the desired object, rejects in substantial entirety that emitted from its environment.

As previously mentioned, it may be desirable to "match" the transmission characteristics of the absorbing layer 51 to those of the object under study. Thus, a product flowing from a process may be continuously monitored by transmitting through it infra-red energy from a black body radiation source. If the absorbing layer 51 of the detector is of the same material as the product under study, its absorption will be greatest in those wave lengths where transmission by the product is least, and vice versa, and therefore a fixed small amount of the infra-red energy transmitted by the product will be absorbed and converted into heat by the detector. However, should the transmission characteristics of the product change due to variations in the proportions of its constituents or through the introduction of impurities, its transmission characteristics will also change, resulting in a change in the detector output, which may be used in a visual indicator or in automatic regulatory devices to correct the process.

To recapitulate, we have combined a heat sensitive detector such as a thermistor flake 26 (Figure 3) with a selective infra-red absorber to provide an infra-red detector responsive mainly to particular desired wave lengths. The infra-red absorber, preferably in the form of a layer 51 (Figure 3), is arranged in close thermal conducting relation with the thermistor and is disposed in the path of the infra-red radiation entering the detector; thus the particular wave lengths of the impinging infra-red energy are selectively converted into heat by the absorber, and the thermistor provides an electrical output proportional to the amount of heat so generated. The remaining wave lengths are either reflected by the absorber or transmitted therethrough to the thermistor flake which is relatively inefficient in converting infra-red radiation into heat. The absorber-thermistor combination thus acts as an effective filter in addition to being a sensitive infra-red detector.

As pointed out above, this type of filter is particularly effective in differentiating infra-red radiation emitted by an object from that emitted by a body in close thermal proximity thereto. By using an absorber of the same material as the object under study, the response characteristics of the detector are made to substantially coincide with the emission characteristics of the object to thus exclude the greater part of the radiation from the interfering body.

Turning now to Figure 6, there is shown a more refined embodiment of our selective bolometer generally indicated at 62 having a cylindrical casing 64 preferably of plastic. Preferably a thin infra-red reflector 66 in the form of a disk is fitted into an annular recess 68 set back from the edge 64a of casing 64 to thus form a shallow cup generally indicated at 70. A thin film 72 of polyethylene terephthalate or other material having good electrical insulation properties is affixed to sheet 66 by a cement layer 74 and supports a thermistor flake 76 from a second cement layer 78. The ends of flake 76 are gold plated to form electrodes 80 and 82 connecting leads 84, 85, 86, and 87 to pins 88 and 90. These pins, suitably secured near their upper ends to a disk 92 of insulating material, extend through holes 94 and 96 in a bottom cover 98 affixed to housing 64, metal-to-glass seals 100 and 102 serving to secure the pins in this position.

In operation, cup 70 serves as a retainer for an absorbing layer 104 which may be readily changed as desired to change the response characteristics of the bolometer. Layer 104 serves the above-described function of selectively converting impinging radiation into heat which is then conducted through reflector 66, cement layer 74, plastic film 72, and cement layer 78 to thermistor flake 76. Here it changes the temperature of the thermistor flake which provides an electrical signal at pins 88 and 90; this measures the temperature of the material under observation. Reflector 66, which may be used with great advantage in the embodiment of Figure 3, enhances the operation of the bolometer in the following manner. If only a selective absorber is used and at a particular wave length its absorption of energy is 90% and transmission is 10%, then 90% of the energy in the 90% absorption region falling on the bolometer is converted to heat by the absorber in passing through it the first time, and 10% is transmitted to the flake where 5% more is converted to heat. Thus a total of 95% of the incident energy at the 90% wave length is converted to heat. In the 10% absorption region, 10% of the energy is absorbed by the film and about half of the residual energy, i.e. 45%, is converted to heat by the flake. Thus a total of 55% of the total energy is converted to heat in this region. The ratio of response between the 90% region and the 10% region is less than 2:1, although the absorber absorbs energy in the ratio of 9:1.

With the reflector construction described, however, all energy not absorbed on the first traversal of the absorption layer is reflected outwardly through it a second time. Thus, in the 90% absorption region, 99% of the incident energy is converted to heat (90% on the first traversal +90% of the remaining 10% on the second traversal). For the corresponding 10% absorption region, the total absorbed energy is 19% (10% on the first traversal +10% of the residual 90% on the second traversal). The ratio of the 90% absorption to 10% absorption with the reflector construction is now greater than 5:1. Such a selectivity ratio is substantially better than the 2:1 ratio achieved without the reflector and is due entirely to the insertion of the reflector 66 in the construction described.

While the numerical example above shows the nature of the improvement in selectivity obtainable by the use of a reflector, it is intended to be illustrative only, and it should be understood that it is substantially simplified; certain effects which result in greater selectivity than that described have been omitted. Thus, in practice selective thermistor bolometers having substantially greater ratios than those herein described have been made utilizing this refined construction. The selective characteristics of the bolometer are thus determined substantially solely by the absorption characteristics of the absorbing layer 104.

Preferably, reflector 66 is of copper, aluminum, or other good infra-red reflecting material having high thermal conductivity and low thermal mass per unit of volume. The reflector should be as thin as possible consistent with the strength requirement imposed thereon in order to keep its thermal mass at a minimum. Preferably, also, similar requirements are imposed on both the insulating film 72 and cement layers 74 and 78, i.e. as thin as possible consistent with strength requirements. Moreover, insulating layer 72 must be thick enough to form effective electrical insulating between reflector 66 and flake 76. A backing, like backing block 27 of Figure 3, is not required in bolometer 62 because reflector 66 rapidly conducts heat away from the flake and into casing 64, thus simulating the function of block 27.

Figure 4 illustrates generally the transmission characteristics of a three mil sheet of silicone resin sold by Dow-Corning Company under the designation "XC–269." There is also depicted therein the relative responsivity of a detector of the type illustrated in Figure 3 having an absorbing layer 51 of the same material with an infra-red reflector interposed between the layer and the thermistor flake 26. It will be seen that the two curves have "opposite" characteristics, the responsivity of the detector being minimum where the transmission of the sheet is maximum and vice versa, and thus the detector may be used in the manner described above to monitor a continuous flow of this product.

Should it be desired to measure the temperature of the silicone resin sheet, its infra-red emission characteristics will be substantially equivalent to the responsivity characteristics of a detector having such an absorbing layer. The response of the detector would thus be "selective" to the emission of the material and, if an object having different characteristics is in close proximity to this material, the detector would be relatively insensitive to radiation from that object. Thus the temperature of a silicone resin sheet passing over hot rollers could be measured, without at the same time measuring the roller temperature.

A bolometer generally indicated at 106, having a liquid selective absorbing layer and forming another embodiment of this invention, is illustrated in Figure 7. Bolometer 106 is generally similar in construction to the bolometer illustrated in Figure 1. Thus, a housing generally indicated at 108 includes a base 110, cylinder 112, and an infra-red transparent window 114 which may be of silver chloride or the like. A thermistor flake 116 is affixed to a plastic film 118 in turn fastened to a backing block 120 by cement layers 122 and 124, film 118 not being necessary if the backing block is of an electrical insulating material. Backing block 120 is secured in any suitable manner to base 10. Electrodes 126 and 128, which may be in the form of gold leaf on the ends of flake 116, communicate through leads 130, 131, 132, and 133 with pins 134 and 136 extending out through holes 138 and 140 in base 110, glass seals 142 and 144 serving as insulators in the manner described above.

An electrical insulating film 146 joined to flake 116 by a cement layer 148 accommodates on its upper surface an infra-red reflector 152 preferably of copper or aluminum and serves to insulate the flake from the reflector. Reflector 152, which is fastened to film 146 by a cement layer 153, has an annular ring portion 152a forming a cup generally indicated at 154 to serve as a receptacle for a liquid absorbing layer 156.

Housing 108 is sealed with an amount of liquid absorbing material in cup 154 sufficient upon evaporation thereof within the housing to form a layer 156 of desired thickness. Accordingly, the liquid evaporates until the atmosphere within the housing is saturated with its vapor, after which no further evaporation takes place, resulting in a film of constant thickness.

Bolometer 106 operates in the manner described above, the radiation of desired wave lengths being absorbed by layer 156 and converted thereby into heat which is conducted through reflector 152, insulating film 146, and cement layers 148 and 153 to thermistor flake 116 to affect the electrical resistance thereof and provide an output signal at pins 134 and 136. Reflector 152, in addition to serving as a receptacle for selective absorbing layer 156, operates as described above to reflect the unwanted wave lengths transmitted by the absorbing layer to eliminate their effect upon the reading obtained. Our invention may also utilize a gaseous infra-red absorber, e.g. the bolometer construction of Figure 3 may be housed in a chamber with the layer 51 replaced by a gaseous atmosphere having the desired absorbing characteristics. Radiation of the desired wave lengths would then be selectively converted into heat detectable by the thermistor flake 26.

Thus we have described an infra-red detector which, by the use of an infra-red absorbing film of selected characteristics in close thermal relation with a heat sensitive device, provides a selective response to radiation of various desired wave lengths. The use of such an absorbing film which is low in cost, easily constructed and maintained, and which may be in the solid, liquid, or gaseous state, allows a conventional thermistor bolometer to select or reject any predetermined desired number of infra-red wave length bands. By using an absorbing film of the same material as the object whose temperature is being measured, the infra-red emission characteristics of the object may be closely approximated by the response characteristics of the bolometer so that the radiation emitted from the object will be readily differentiated from that emitted from its environment. Moreover, by interposing an infra-red reflector between the absorbing film and the thermistor flake, we provide further rejection of unwanted wave lengths with a marked increase in sensitivity to the desired bands.

It will thus be seen that the objects set forth above, among those made apparent from the preceding description, are efficiently attained and, since certain changes may be made in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. In infrared sensitive apparatus selectively responsive to incident infrared radiation of particular wave lengths comprising, in combination, a thermistor electrically responsive to heat energy, a radiation absorber of material which selectively absorbs radiation of said particular wave lengths, the major portion thereof to heat energy, said absorber being in thermal conducting relation with said thermistor and located thereover to intercept infrared radiation, and in infrared reflector having high heat conducting capacity interposed between said absorber and said thermistor, whereby said absorber converts into heat energy the major portion of the incident radiation of said particular wave lengths, and said reflector conducts said heat to said thermistor and reflects back through said absorber radiation transmitted therethrough for further conversion into heat.

2. The combination defined in claim 1 in which the radiation absorber is a solid.

3. The combination defined in claim 1 in which the radiation absorber is a liquid.

4. The combination defined in claim 1 in which the absorber is a gas.

5. The combination defined in claim 1 in which said reflector is a metal piece having sufficient mass to act as a heat sink for said thermistor.

6. In infrared sensitive apparatus responsive to the infrared radiation emitted from a particular body, in combination, a thermistor electrically responsive to heat energy, a radiation absorber made of the same material as said body to absorb radiation transmitted therefrom and convert the major portion thereof to heat energy, said absorber being in thermal conducting relation with said thermistor and located thereover to intercept infrared radiation from said object, and an infrared reflector having high heat conducting capacity interposed between said absorber and said thermistor, whereby said absorber converts into heat energy the major portion of the incident radiation from said object and said reflector conducts heat to said thermistor and reflects back through said absorber radiation transmitted therethrough for further conversion into heat.

References Cited in the file of this patent

UNITED STATES PATENTS

| | | |
|---|---|---|
| 2,423,476 | Billings et al. | July 8, 1947 |
| 2,562,538 | Ayer | July 31, 1951 |
| 2,587,674 | Aiken | Mar. 4, 1952 |
| 2,658,390 | Machler | Nov. 10, 1953 |
| 2,768,265 | Jenness | Oct. 23, 1956 |

FOREIGN PATENTS

| | | |
|---|---|---|
| 744,914 | Great Britain | Feb. 15, 1956 |